United States Patent [19]

Romere

[11] 3,844,164
[45] Oct. 29, 1974

[54] END AREA INSPECTION TOOL FOR AUTOMATED NONDESTRUCTIVE INSPECTION

[75] Inventor: John M. Romere, Houston, Tex.

[73] Assignee: AMF Incorporated, White Plains, N.Y.

[22] Filed: Oct. 3, 1973

[21] Appl. No.: 402,989

[52] U.S. Cl. ............... 73/67.8 S, 73/71.5 U, 324/37
[51] Int. Cl. ............................................ G01n 29/04
[58] Field of Search......... 73/67.5 R, 67.8 S, 71.5 U; 324/37

[56] References Cited
UNITED STATES PATENTS
3,262,053  7/1966  Nasir et al. ........................... 324/37
FOREIGN PATENTS OR APPLICATIONS
1,459,963  10/1966  France ............................ 73/71.5 U Primary Examiner—James J. Gill
Attorney, Agent, or Firm—George W. Price; John H. Gallagher

[57] ABSTRACT

Nondestructive inspection apparatus is mounted on a freestanding housing unit having motorized wheels for driving the housing unit around the circumference of a ferromagnetic pipe. The housing unit includes an electromagnet and pole pieces which are slightly spaced from the surface of the pipe to establish a magnetic circuit with the pipe, thereby producing an attractive force that holds the wheels of the housing unit against the pipe surface, irrespective of the location of the unit on the pipe circumference. Means are provided for keeping the housing unit axially located at the end region of the pipe as it rotates thereabout. The nondestructive inspection apparatus inspects the end region of the pipe as the housing rotates about the pipe.

10 Claims, 5 Drawing Figures

END AREA INSPECTION TOOL FOR AUTOMATED NONDESTRUCTIVE INSPECTION

BACKGROUND OF THE INVENTION

In the manufacture of seam welded pipe and tubular goods, flat sheets of steel first are produced at a steel mill. These sheets then are cut to size, shaped into tubular form, and welded along a seam to form the closed tubular product. The ultimate use of the tubular products thus produced may be in a pipeline, for example, where successive lengths are joined end to end by girth welds. Industry standards require that the end regions of the pipes where the welds are formed must be free of potentially injurious anomalies such as laminar type defects so that high quality girth welds may be made. However, in the manufacture of the steel sheets from which the pipe is formed, laminar type defects sometimes are created and may occur in the end region of a pipe where a girth weld is to be made.

In the past, end area inspection apparatus has included a spider or clamping means which clamped to the end of a tubular member and supported a central rod which extended into the end of the member. An inspection head or transducer was supported at the inner end of the rod. The rod and inspection head was rotated by hand or by motor means attached to the outer end of the rod. This apparatus was somewhat cumbersome to handle and required set up and take down time and effort.

It therefore is desirable that the inspection apparatus be small and easy to handle, and be reliable and versatile in operation.

SUMMARY OF THE INVENTION

In accordance with the present invention, nondestructive inspection apparatus is provided for detecting anomalies in the end area of a tubular member of ferromagnetic material. The apparatus includes a housing member mounted on power driven wheels so that it may be rotated about the inner or outer circumference of the tubular member. The housing member includes an electromagnet and pole pieces which are slightly spaced from the surface of the tubular member so as to establish a magnetic attraction force that holds the housing member on the steel tubular mmeber as it rotates about the circumference of the pipe.

Nondestructive inspection apparatus, such as an ultrasonic inspection transducer, is carried by the housing member and is operated to perform ultrasonic inspection of the end area of the tubular member as the housing member rotates about the circumference. The wheels on the housing member are slightly canted or toed in relative to the end of the tubular member so that as the unit rotates an axial force is produced which tends to urge the housing member axially away from the open end of the tubular member. Follower means which engage the end surface of the tubular member resists the axial force and allows the housing to rotate about the end areas without moving axially and without dropping out of the end region of the member. Once the apparatus is placed in the end region of a tubular member it is held on the pipe by the magnetic attractive force and rotates about the end of the tubular member and performs its inspection operation unassisted by a human operator.

DETAILED DESCRIPTION OF PREFERRED EMBODIMENT

Figure 1:
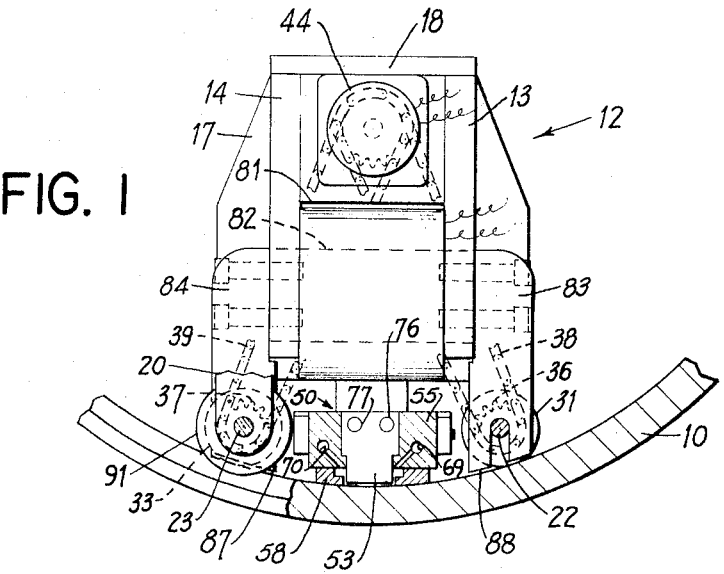
FIGS. 1-3 are, respectively, partial end sectional, partial side elevational, and bottom views illustrating the inspection apparatus of the present invention.
Figure 2:
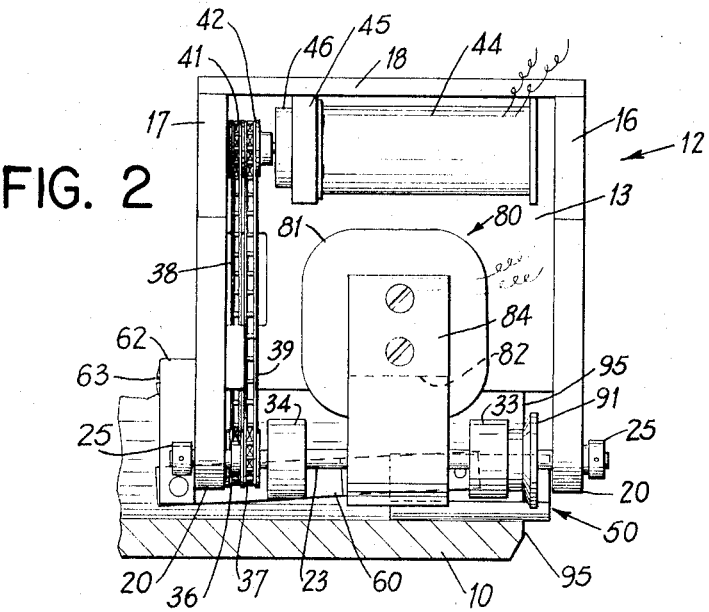
Figure 3:
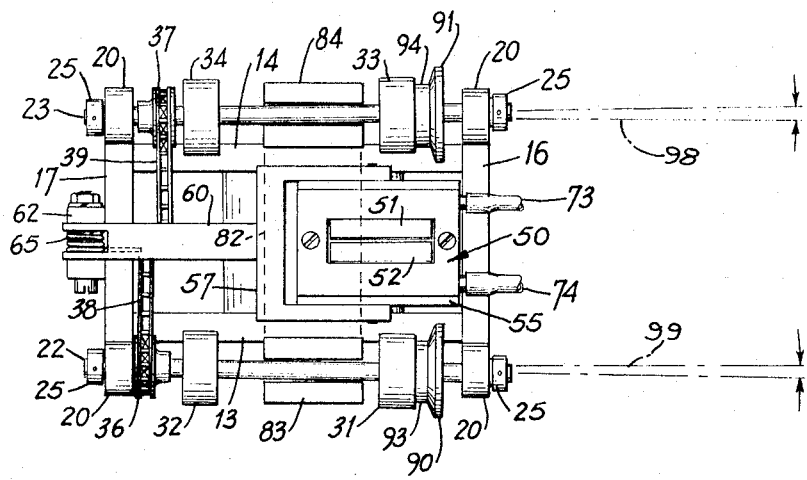

Referring in detail to FIGS. 1-3, the end region of a ferromagnetic pipe 10 is to be inspected for anomalies. As illustrated, the end of pipe 10 is beveled to facilitate the making of a girth weld. The apparatus of this invention is comprised of a housing unit 12 formed of side plates 13 and 14, end plates 16 and 17, and a top plate 18. Desirably, all of the above-mentioned plates are made from a nonmagnetic material such as aluminum.

The bottoms of end plates 16 and 17 have rounded legs 20 which extend downwardly from the corners thereof. The legs 20 are apertured to form bushings that receive axles 22 and 23 which extend through the bushings. Axles 22 and 23 are made of nonmagnetic materials and are held in position by means of collars 25 which are secured to the ends of the axles by suitable means such as set screws. Rollers or wheels 31, 32 and 33, 34 are respectively secured to and rotate with axles 22 and 23 and support housing unit 12 on the inner surface of pipe 10. Wheels 31-34, or at least the outer portions thereof, are made of a plastic material such as polyurethane to provide a good gripping surface with the pipe 10.

Axles 22 and 23 also have secured thereto respective chain sprockets 36 and 37 which engage respective drive chains 38 and 39. As best seen in FIG. 2, the chains are driven from sprockets 41 and 42 mounted on the drive shaft of motor 44. The motor is secured to a mounting bracket 45, and may have a gear reduction mechanism 46 associated with it. It may be seen that rotation of the drive shaft of motor 44 drives axles 22 and 23 and wheels 31-34 to cause housing unit 12 to rotate circumferentially on the inner surface of pipe 10. As will be explained below, means are provided for causing housing unit 12 to rotate through a full 360° circumferential path around pipe 12 without any auxiliary supporting structure.

To provide nondestructive inspection of the end area of pipe 10 as the housing unit rotates thereabout, housing unit 12 carries an inspection head 50, FIGS. 1 and 3, which in this instance is illustrated to be ultrasonic inspection apparatus. As illustrated in the bottom view of FIG. 3, inspection head 50 may include two ultrasonic crystal transducers 51 and 52 which are supported in a plastic casing 53, FIG. 1. Still referring to FIG. 1, casing 53 is held in a frame 55 that is supported in a gimbal or clevis 57 in a manner to permit a shaped, apertured wear plate 58 to make good contact with the inner surface of pipe 10. As seen best in FIGS. 2 and 3, clevis 57 is supported at the end of an arm 60 which in turn is pivotally secured to a bracket member 62 that is attached by bolts 63 to end plate 17. An L-shaped spring 65 urges arm 60 downwardly to hold wear plate 58 in good contact with the surface of pipe 10.

Support frame 55, FIG. 1, includes fluid passages 69 and 70 which are in communication with flexible hoses 73 and 74, FIG. 3, to supply an ultrasonic coupling liquid such as water to the void space between the crystal transducers 51 and 52 and the inner surface of pipe 10.

Electrical connectors 76 and 77, FIG. 1, are attached to the inspection head to provide electrical connection to the crystal transducers. Inspection head 50 may include two crystal transducers 51, 52, as illustrated, or it may include just one crystal. The ultrasonic apparatus itself may be commercially available apparatus and its specific design and operation is not the subject of the present invention.

The above-mentioned means for permitting housing unit 12 to rotate completely about the inner circumference of pipe 10 without auxiliary support means includes an electromagnet 80 comprised of solenoid 81, core 82, and removable pole pieces 83 and 84. As seen in FIG. 3, the bottoms of pole pieces 83 and 84 are forked to permit axles 22 and 23 to pass therethrough. As seen in FIGS. 1 and 2, pole pieces 83 and 84 are shaped and arranged to provide uniform narrow air gaps 87, 88 between their bottom surfaces and the inner surface of pipe 10. It is seen that core 82, pole pieces 83 and 84, and the portion of ferromagnetic pipe 10 between the pole pieces constitutes a magnetic circuit that is substantially closed except for the very narrow air gaps 87 and 88. This magnetic circuit provides an attractive force that maintains wheels 31–34 against the surface of pipe 10 but yet allows the nonmagnetic wheels to be driven to move the housing unit. The strength of electromagnet 80 and the characteristics of the magnetic circuit are proportioned so as to provide a sufficiently strong magnetic attractive force to hold the wheels against the pipe surface throughout the full 360° rotation of the housing unit 12 about the circumference of pipe 10.

In the rotation of housing unit 12 about pipe 10 there may be some tendency for the unit to move parallel to the axis of the pipe, either inwardly away from the end region, or outwardly in which case it might fall out of the open end of the pipe. To prevent this axial movement, follower means such as washers 90 and 91 are secured to axles 22 and 23, respectively. Follower washers 90 and 91 are larger in diameter than wheels 31–33 and are spaced from respective wheels 31 and 33 by spacer washers 93 and 94. The spacing is chosen so that when follower washers 90 and 91 overhang the end 95 of pipe 10 the inspection head 50 is properly positioned to inspect the end region of the pipe. Furthermore, axles 22 and 23 are not parallel to the axis of pipe 10 and are not parallel to each other, but each is slightly canted or toed in, as illustrated in FIG. 3, by a small angle relative to lines 98 and 99 which are parallel to the axis of a pipe being inspected. The two axles are oppositely canted away from the parallel so that for either the clockwise or counterclockwise direction of rotation about pipe 10, the canted wheels will tend to cause housing unit 12 to move farther into the pipe, i.e., to the left as in FIG. 2. However, because follower washers 90 and 91 are movably engaged with the end of the pipe, they prevent axial movement of the housing unit as it rotates about the pipe. The unit therefore follows around a circular path on the inner surface of the pipe when motor 44 is actuated to drive wheels 31–34.

In the use of the inspection apparatus it is desirable that motor 44 be a reversable motor so that it may make one traversal around the pipe in one direction and the next rotation in the opposite direction. This prevents the electrical leads and cables, and water tubes 73 and 74 from becoming twisted.

The apparatus just described is versatile and one basic device may readily be adapted to inspect the end regions of pipes and tubes of different diameters, and may inspect the end or edge regions of flat plate material. Referring to FIGS. 1 and 2 it may be seen that pole pieces 83 and 84 are removably secured to core 82 by means of bolts or screws. It also is seen that the bottom surfaces of the pole pieces are shaped to provide a uniformly narrow air gap between them and the inner surface of pipe 10. In practice, a number of pairs of pole pieces having different contours at their bottoms will be available so that many different sized pipe may be inspected merely by placing a respective appropriately shaped pair of pole pieces in the magnetic circuit with core 82. In this manner, uniformly narrow air gaps 87 and 88 are assured. When inspecting flat plate material, the bottoms of pole pieces 83 and 84 would, of course, be flat and parallel to the surface of the sheet. When inspecting different size pipe or flat sheet, it may or may not be required that the shaped wear plate 58 on inspection head 50 be changed so that it too will be compatible with the surface being inspected. Pole pieces 83 and 84 also may be shaped so that housing unit 12 may move about the outer surface of a tubular member rather than the inner surface as illustrated.

The inspection apparatus of this invention is extremely versatile and simple to use. The apparatus is relatively light in weight and is easily handled by one man. Once it is placed at the end region of a pipe with follower washers 91 and 92 engaged with the end of pipe 10, the operator need not attend it except to reverse the direction of rotation of motor 44 in order to reverse the direction of rotation of the apparatus on successive rotations, and even this may be accomplished automatically with relatively simple switching apparatus if desired. The operator may stop the inspection apparatus at any position along its circumferential path and may reverse its direction to double check any region of particular interest. Because the apparatus is freestanding or self supporting on the surface of the object to be inspected, its use considerably shortens the time required to inspect each end region. This is to be contrasted with known apparatus which is not freestanding on the inner surface of the pipe, for example, but is supported by auxiliary equipment such as clamps and spiders which must be attached to and removed from the end of each pipe being inspected. The prior art apparatus also often involved rather cumbersome drive means.

Although the apparatus described above presently is the preferred embodiment of the invention, alternative embodiments thereof are possible. For example, in place of electromagnet 80, FIG. 2, a permagnet may be used if space and weight requirements permit. Additionally other inspection techniques such as eddy current or flux leakage inspection may be employed instead of ultrasonic. In the case of flux leakage inspection, a magnetic flux field already is present in the wall of pipe 10 due to electromagnet 80 and pole pieces 83 and 84. Inspection head 50 in that case would be a search coil, as is standard practice.

Figure 4:
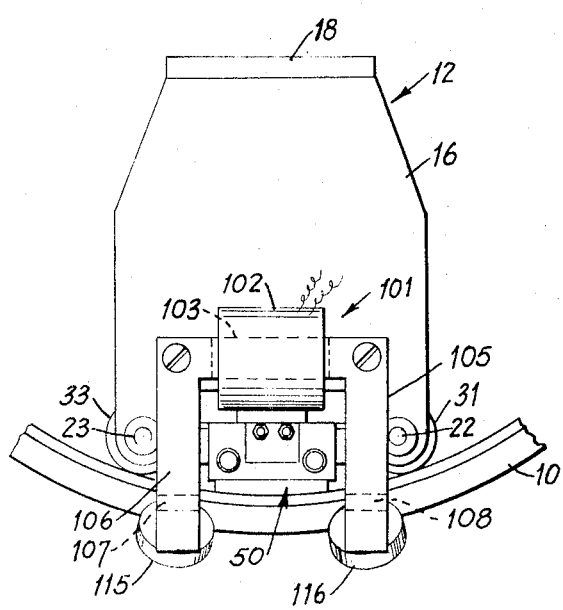
FIGS. 4 and 5 are simplified partial views illustrating alternative means for maintaining the inspection apparatus of this invention in a desired circumferential path as it rotates about the end region of a pipe.
Figure 5:
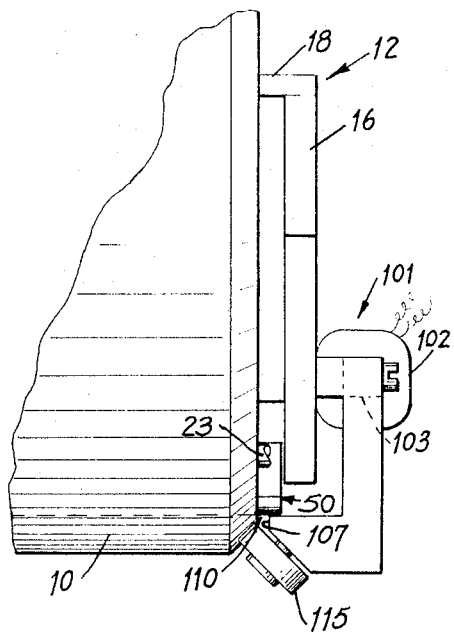

The specific means described above for maintaining the apparatus at a fixed axial position at the end area of the pipe is separately claimed in application Ser. No. 402,061, filed concurrently herewith in the name of Donald E. Savoy, entitled "Improved End Area Inspection Tool for Automated Nondestructive Inspection" and assigned to applicant's assignee. An alternative means for maintaining the apparatus at a fixed axial position at the end of the pipe is illustrated in the simplified drawings of FIGS. 4 and 5. The end view of FIG. 4 shows freestanding housing unit 12 on the inner surface of pipe 10 with its rollers or wheels 31 and 33 located inwardly from the end of the pipe and with inspection head 50 located at its desired axial position at the end area of pipe 10. To maintain housing unit 12 at the desired axial position, another electromagnet 101 is utilized to establish a magnetic field with the very end face of pipe 10. Electromagnet 101 includes solenoid 102 and core 103 which is spaced from end plate 16 in order to provide room for solenoid 102. The magnetic circuit further includes spaced pole pieces 105 and 106 which terminate in respective pole faces 107 and 108 that are uniformly spaced from the end surface of pipe 10 by respective narrow air gaps 110, FIG. 5. A magnetic circuit thus is established with a circumferential portion of the end of pipe 10 and a magnetic attractive force is produced which tends to pull housing unit 12 axially toward the left, as viewed in FIG. 5. Follower means such as nonmagnetic rollers 115 and 116 are mounted on pole pieces 105 and 106 to resist the magnetic attractive force and maintain housing unit 12 at a fixed axial position at the end area as the housing unit rotates circumferentially about pipe 10.

What is claimed is:

1. In nondestructive inspection apparatus for inspecting the end region of a ferromagnetic member, the combination comprising
   a housing unit,
   wheels on said housing unit for supporting it on a surface of the member in a freestanding manner,
   motor drive means on the housing unit for moving the housing unit on its wheels along said surface,
   nondestructive inspection apparatus carried by the housing unit for inspecting the member as the unit moves relative thereto,
   magnet means on the housing unit for establishing a magnetic circuit with said member and producing an attractive force sufficient in magnitude to maintain said wheels in contact with said member as the unit moves along said surface, and
   means on said housing unit for maintaining said housing unit in a desired path relative to the end region of the member as the unit moves along the surface of the member.

2. In nondestructive inspection apparatus for inspecting a cylindrically shaped ferromagnetic member, the combination comprising
   a freestanding housing unit adapted to be placed on a surface of the member,
   wheels on said unit for permitting said unit to rotate circumferentially around said member,
   motor drive means on the housing unit for driving said unit circumferentially around said member,
   nondestructive inspection apparatus carried by the housing unit for inspecting said member as the unit rotates thereabout,
   magnet means carried on the housing unit for establishing a magnetic circuit with at least a portion of said member and producing an attractive force acting between the housing unit and member, said force being sufficient in magnitude to maintain the wheels on said surface as the unit rotates completely about the circumference of the member, and
   means on the housing unit for causing the unit to follow a desired path around the surface of the member.

3. The combination claimed in claim 2 wherein said last recited means includes
   means for maintaining said housing unit a fixed distance from an end of the member as the unit rotates.

4. The combination claimed in claim 3 wherein the means for maintaining the housing unit a fixed distance from an end of the member includes
   means carried by the housing unit for producing a force tending to urge the housing means axially away from said end of the member as the unit rotates about said surface, and
   follower means carried by the housing unit and movably engaging the end of the member for resisting said force and maintaining the housing unit in a desired circular path as it rotates about the member.

5. The combination claimed in claim 4 wherein the means for producing said force comprises,
   second magnet means carried on the housing unit for establishing a magnetic circuit with an end edge of said member and producing an axially directed magnetic attractive force between the housing unit and member.

6. In nondestructive inspection apparatus for inspecting a ferromagnetic tubular member, the combination comprising
   a housing unit,
   wheels on the housing unit supporting it in a freestanding manner for rotation about the circumference of a tubular member,
   motor means carried by the housing unit for driving said wheels,
   nondestructive inspection apparatus carried by the housing unit for inspecting the tubular member as the unit rotates thereabout,
   magnet means on the housing unit for establishing a magnetic circuit with the wall of the tubular member and producing an attractive force sufficient in magnitude to maintain said wheels in contact with the tubular member as the unit rotates thereabout, and
   means on the housing unit in movable contact with the tubular member for causing the rotating housing unit to follow a desired path around the tubular member.

7. In nondestructive inspection apparatus for inspecting an end area of a ferromagnetic tubular member, the combination comprising
   a freestanding housing unit adapted to be inserted within an end of a tubular member,
   wheels on said housing for rotatably supporting said unit on the inner surface of the member,
   motor means on the housing unit for driving at least some of the wheels to move the unit circumferentially about the inner surface of the member, nondestructive inspection apparatus carried by the housing unit for inspecting the end area of the tubular member as the unit rotates thereabout, magnet means including first and second magnet pole pieces carried in spaced apart relationship on said housing unit, said pole pieces being closely spaced relative to said inner surface to provide a magnetic circuit with a portion of the tubular member for establishing an attractive force sufficient to hold the unit on the inner surface of the member as the unit rotates thereabout, and means on the housing unit for maintaining the rotating unit in a desired circumferential path relative to said end of the tubular member.

8. The combination claimed in claim 7 wherein the means for maintaining the rotating unit in a desired circumferential path comprises, means carried by the housing unit for producing an axial force tending to move the rotating unit farther within the tubular member and farther away from said end of the member, and follower means on the housing unit movably contacting the end of the member for resisting said axial force and maintaining the housing at a desired axial position as the unit rotates circumferentially completely about the surface of the member.

9. The combination claimed in claim 7 wherein the means for maintaining the rotating unit in a desired circumferential path is comprised of second magnet means including second pole pieces carried by the housing unit, said second pole pieces being closely spaced to an end edge of the tubular member to provide a magnetic circuit with at least a portion of said end edge, thereby establishing an attractive force between the housing unit and member, and follower means on the housing unit movably contacting the end of the member for maintaining a fixed spacing between the second pole pieces and said end edge of the tubular member.

10. The combination claimed in claim 9 wherein said follower means includes roller means secured relative to said housing unit and in rolling contact with said end edge of the tubular member.

* * * * *